United States Patent [19]

Lüben

[11] 4,264,267
[45] Apr. 28, 1981

[54] FEED CHANNEL FOR CYLINDRICAL WORKPIECES

[75] Inventor: Heinz-Ernst Lüben, Hilden, Fed. Rep. of Germany

[73] Assignee: Th. Kieserling & Albrecht, Solingen, Fed. Rep. of Germany

[21] Appl. No.: 86,771

[22] Filed: Oct. 22, 1979

[30] Foreign Application Priority Data

Oct. 14, 1978 [DE] Fed. Rep. of Germany ....... 2844887

[51] Int. Cl.³ ............................................. B66F 11/00
[52] U.S. Cl. ................................................. 414/748
[58] Field of Search ............ 414/745, 748, 910, 14–18; 269/130, 131, 46, 13; 193/32, 40; 294/16; 72/99

[56] References Cited

U.S. PATENT DOCUMENTS

| 3,759,077 | 9/1979 | Hartkopf | 72/99 |
| 4,038,861 | 8/1977 | Hartkopf | 414/748 X |

FOREIGN PATENT DOCUMENTS

| 415774 | 7/1925 | Fed. Rep. of Germany | 72/99 UX |
| 2217717 | 5/1974 | Fed. Rep. of Germany | 72/99 UX |
| 2449241 | 4/1976 | Fed. Rep. of Germany | 72/99 UX |
| 50498 | 9/1966 | German Democratic Rep. | 414/748 UX |
| 128102 | 4/1976 | German Democratic Rep. | 414/748 UX |
| 121762 | 8/1976 | German Democratic Rep. | 72/99 UX |
| 538954 | 12/1976 | U.S.S.R. | 414/748 |

Primary Examiner—Robert B. Reeves
Assistant Examiner—Gene A. Church
Attorney, Agent, or Firm—Edward E. Sachs

[57] ABSTRACT

A feed channel for feeding elongated cylindrical workpieces longitudinally includes a channel bottom portion on which the workpieces are deposited from above. Flexible bands extend transversely across the channel bottom portion for receiving workpieces moving downwardly toward the channel bottom portion and then lowering the workpieces onto the channel bottom portion. The bands are movable between an upper workpiece supporting position spaced above the channel bottom portion and a lower workpiece releasing position in which a workpiece is released from the bands and supported on the channel bottom portion.

13 Claims, 3 Drawing Figures

FEED CHANNEL FOR CYLINDRICAL WORKPIECES

BACKGROUND OF THE INVENTION

This application relates to the art of work-piece feed channels and, more particularly, to such feed channels into which workpieces are dropped from above. The invention relates to means for smoothly lowering workpieces into the feed channel for minimizing any noise associated with dropping of the workpiece into the channel. Although the invention is particularly applicable to feed channels of the type described, it will be appreciated that certain aspects of the present invention may be used in other workpiece handling apparatus.

Elongated cylindrical workpieces, such as rods, pipes and wire, are commonly fed longitudinally through peeling or straightening machines. During feeding of such workpieces through the peeling or straightening machine, the workpiece is supported in a feed channel which is substantially circumferentially continuous to surround the workpiece. The workpiece is rotated about its longitudinal axis and moved longitudinally from the feed channel through the peeling or straightening machine.

In apparatus of the type described, a workpiece is commonly dropped from above down into the feed channel which can be opened and closed for respectively receiving a new workpiece and then feeding same longitudinally. Dropping metal workpieces of the type described down into the feed channel through a relatively great distance produces very loud noises which are objectionable in modern manufacturing facilities. Mechanical devices have been developed for smoothly lowering the workpieces into the feed channel and thereby reducing the noise. However, the mechanical devices for smoothly lowering the workpieces are very expensive to manufacture and maintain, and the controls for such devices further increases the costs.

SUMMARY OF THE INVENTION

A feed channel of the type described is provided with flexible band means extending transversely across the channel bottom portion. A workpiece falling downwardly toward the channel bottom portion is caught and supported by the flexible band means which then moves downwardly and lowers the workpiece onto the channel bottom portion.

In one arrangement, the flexible band means includes an elongated flexible band having opposite band ends attached to movable band support members located on opposite sides of the channel bottom portion. Movement of the band support members toward one another causes the band to assume a pronounced U-shaped configuration for releasing a workpiece from the bands onto the channel bottom portion. Movement of the band support members away from one another pulls the bands out of their pronounced U-shaped configuration, and raises the bands to an upper workpiece receiving and supporting position.

In a preferred arrangement, the movable band support members are defined by movable channel segments which cooperate with the channel bottom portion to form a circumferentially continuous channel surrounding a workpiece received therein. The movable segments are pivoted on pivot axes located on opposite sides of the channel bottom portion, and the band ends are attached to the movable channel segments above the pivot axes.

Movement of the movable channel segments away from one another to an open position allows a workpiece to fall therebetween toward the channel bottom portion. In the open position of the movable channel segments, the flexible band means is located in an upper workpiece receiving and supporting position spaced above the channel bottom portion. Movement of the movable channel segments toward one another to a closed position also moves the flexible band means toward a lower workpiece releasing position in which a workpiece is released from the band means for support by the channel bottom portion.

The movable channel segments may have upwardly facing workpiece supporting surfaces for supporting a workpiece thereon in the closed position of the movable channel segments. When the movable channel segments are moved toward their open position, a workpiece falls from the upwardly facing workpiece supporting surfaces onto the flexible band means for lowering of the workpiece onto the channel bottom portion when the movable channel segments are moved to their closed position.

It is a principal object of the present invention to provide a feed channel with economical and simple means for smoothly lowering workpieces into the channel with a minimum of noise.

It is a further object of the invention to provide a feed channel with flexible bands for lowering workpieces onto the channel bottom portion, and controlling movement of the bands through movement of movable channel segments.

DESCRIPTION OF A PREFERRED EMBODIMENT

Figure 2:
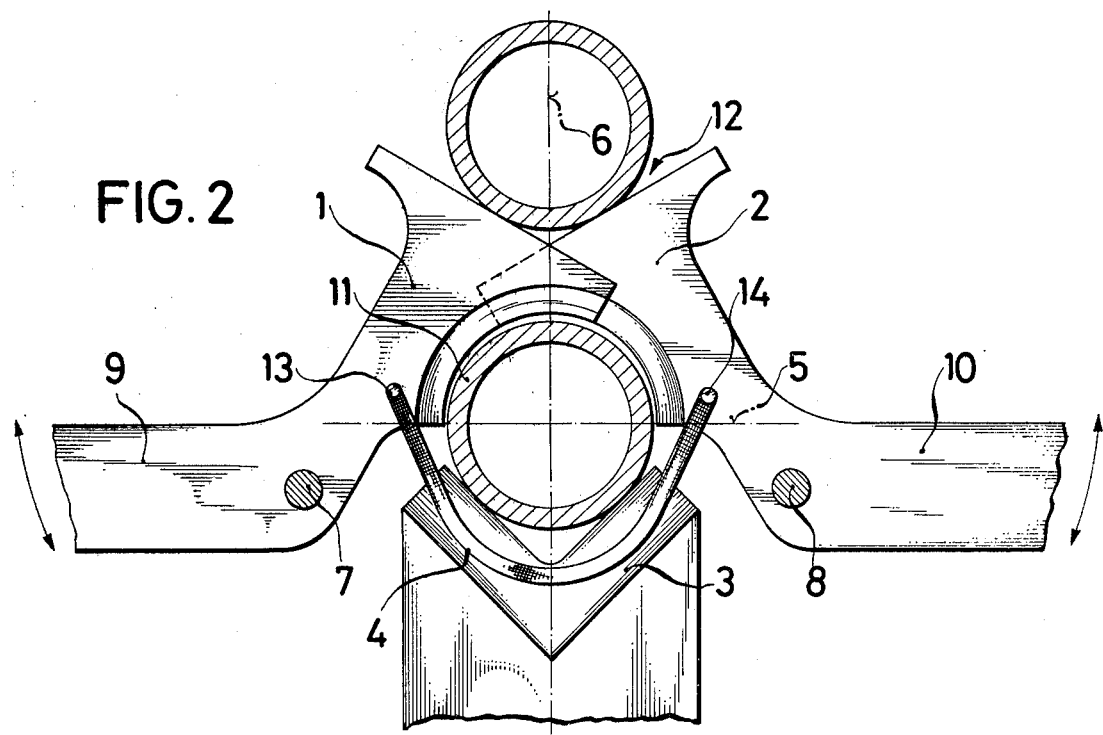
FIG. 2 is a view similar to FIG. 1 and showing the movable channel segments in their closed position.
Figure 3:
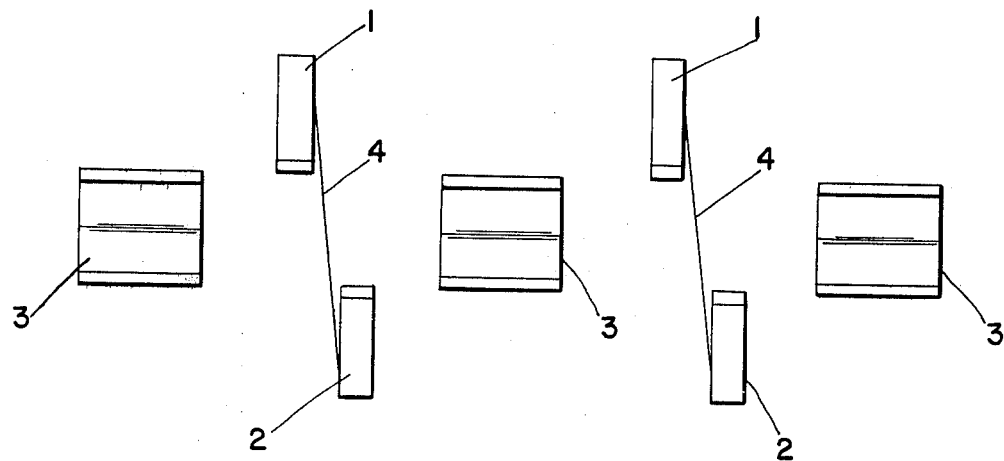
FIG. 3 is a schematic plan view showing spaced plural bottom channel portions and spaced plural pairs of opposed channel segments in open positions.

With reference to the drawing, there is shown a group of channel segments 1, 2 and 3 which cooperate with one another to form an opening in which a workpiece 11 is surrounded as shown in FIG. 2. The entire workpiece feed channel includes a plurality of longitudinally-spaced channel bottom portions 3, and a plurality of generally opposite pairs of movable channel segments 1, 2 as shown in FIG. 3. The movable channel segments 1, 2 are longitudinally-spaced from the channel bottom portion 3 and are also spaced longitudinally from one another as shown in FIG. 3.

The movable channel segments 1, 2 are fixed to shafts 7, 8 which also define pivot axes for the movable segments. The shafts 7, 8 extend the full length of the feed channel and a plurality of the movable segments 1, 2 are fixed thereto at spaced locations. Lever arms 9, 10 on the movable channel segments 1, 2 are suitably connected with a hydraulic cylinder or the like for rotating the movable segments and the shafts 7, 8 for moving the segments 1, 2 between the open position of FIG. 1 and the closed position of FIG. 2.

An elongated flexible band 4 is attached between the movable channel segments 1, 2 and extends transversely across the channel bottom portion 3. The flexible band 4 is preferably of any suitable woven textile material. However, it will be appreciated that other flexible materials can also be used. The flexible band 4 has opposite band ends attached to the movable channel segments 1, 2 at attachment points 13, 14 of FIG. 2 spaced above pivot axes 7, 8.

The horizontal centerline of the largest cylindrical workpiece to be fed through the channel is represented by line 5 and the vertical center thereof is represented by line 6. These lines also represent the horizontal and vertical centers of the substantially closed circumferential channel in which the workpieces are substantially surrounded for transportation. The attachment points 13, 14 are located above the horizontal centerline 5 and are symmetrically arranged on opposite sides of the vertical centerline 6. The flexible band 4 has a length of approximately 1.2 to 3 times the diameter of the largest workpiece 11 to be fed through the channel. The length of the flexible band depends upon the type of movement imparted to the band ends. The pivot axes defined by the shafts 7, 8 are located well below the horizontal centerline 5 so that pivotal movement of the movable channel segments 1, 2 moves the band attachment points 13, 14 both vertically and horizontally.

Figure 1:
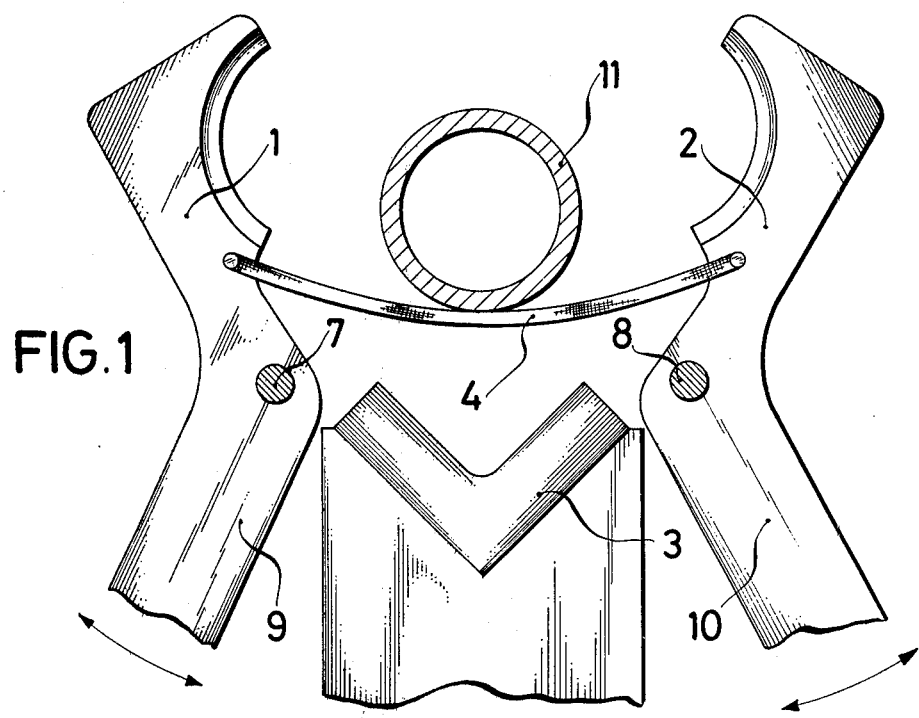
FIG. 1 is an end elevational view of a workpiece feed channel having the improvements of the present application incorporated therein, and with a workpiece and pivot shafts for movable channel segments in section for clarity of illustration, with the movable channel segments being shown in their open position.

The movable channel segments 1, 2 have upwardly facing workpiece supporting surfaces which cooperate to define a generally V-shaped trough 12 in the closed position of the movable channel segments 1, 2 as shown in FIG. 2. When the movable channel segments 1, 2 are moved generally away from one another to their open position as shown in FIG. 1, a workpiece 11 formerly supported in the trough 12 falls downwardly between the movable channel segments 1, 2. When the movable channel segments 1, 2 are moved to their open position of FIG. 1, the flexible band 4 is moved upwardly and pulled across the channel bottom portion 3 in upwardly-spaced relationship thereto to define a workpiece receiving and supporting position. Thus, the workpiece 11 is caught and supported on the flexible band 4 as shown in FIG. 1. As the movable channel segments 1, 2 are moved toward their closed position of FIG. 2, the band attachment points 13, 14 move downwardly and toward one another so that the flexible band 4 assumes a pronounced U-shaped configuration to define a workpiece releasing position in which the workpiece 11 is supported on the channel bottom portion 3. The band 4 hangs in the space between the segments 1, 2 and 3 so it is located below the upwardly facing workpiece supporting surface of the channel bottom portion 3. This insures free rotation of the workpiece 11 within the channel as the workpiece is fed longitudinally therethrough without engaging the flexible band 4. The inner surfaces of the movable channel segments 1, 2 are spaced outwardly from the workpiece to allow rotational and longitudinal movement of the workpiece therethrough.

In the arrangement shown and described, the flexible band 4 is attached to movable members which also define the movable channel segments 1, 2. However, it will be appreciated that other movable band support members can be provided if so desired. In addition, it will be recognized that it is possible to move only one end of the band for moving the band between its upper workpiece receiving and supporting position and its lower workpiece releasing position. With the attachment points 13, 14 located above the pivot axes defined by the shafts 7, 8, the weight of a workpiece 11 on the bands 4 aids in moving the movable channel segments 1, 2 toward their closed position of FIG. 2.

The workpiece feed channel may be considered to be circumferentially continuous as shown in FIG. 2 in the sense that the workpiece 11 cannot be laterally displaced therefrom even though small spaces exist between the movable segments 1, 2 and the fixed channel segment defined by the channel bottom portion 3. A flexible band 4 extends between each pair of movable channel segments 1, 2 and there are a plurality of pairs of such movable segments at spaced locations along the length of the feed channel. Therefore, there are a plurality of transverse flexible bands 4 at longitudinally-spaced locations along the length of the feed channel.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Apparatus for longitudinally transporting elongated workpieces comprising: a feed channel having a channel bottom portion on which elongated workpieces are deposited from above, flexible band means extending transversely across said channel bottom portion for receiving workpieces moving downwardly toward said channel bottom portion, said band means being movable between an upper workpiece supporting position spaced above said channel bottom portion and a lower workpiece releasing position in which a workpiece is released from said band means and supported on said channel bottom portion, said channel including opposite channel segments at least one of which is movable toward and away from the other between open and closed positions, said channel in said closed position of said movable segment being sufficiently closed circumferentially to prevent lateral outward displacement of a workpiece from within said channel, and said channel in said open position of said movable segment having an upwardly open path for movement of workpieces downwardly onto said channel bottom portion.

2. The apparatus of claim 1 wherein said band means comprises at least one flexible band having opposite band ends, band support members on opposite sides of said channel movable toward and away from one another, said band ends being attached to said band support members above said channel bottom portion, said band support members being movable toward one another for locating said band in said releasing position in which said band hangs down in a generally U-shaped configuration between said band ends, and said support members being movable away from one another for locating said band in said workpiece supporting position in which said band is pulled out of said U-shaped configuration.

3. The apparatus of claim 2 wherein said band support members are pivotally mounted on pivot axes for movement toward and away from one another and said band ends are attached thereto in spaced relationship to said pivot axes for movement of said band ends downwardly and toward one another upon movement of said band support members toward one another and for movement of said band ends upwardly and away from one another upon movement of said band support members away from one another.

4. The apparatus of claim 2 wherein said channel transports elongated generally cylindrical workpieces and said band has a length between said ends which is greater than the diameter of the largest cylindrical workpiece which can be transported in said channel.

5. Apparatus for transporting elongated workpieces comprising: a feed channel including a plurality of longitudinally-spaced channel bottom segments having an upwardly facing workpiece supporting surface and a plurality of opposed pairs of movable segments spaced intermediate said bottom segments and cooperating therewith to define a circumferentially continuous feed channel in which elongated workpieces are surrounded for longitudinal transportation, each said pair of movable segments being movable toward and away from one another between open and closed positions, a flexible band extending between each said pair of movable segments and being movable with said movable segments between an upper workpiece receiving and supporting position spaced above said bottom segments and a lower workpiece releasing position spaced below said workpiece supporting surfaces of said bottom segments, and said bands being in said workpiece receiving and supporting position in said open position of said movable segments and being in said workpiece releasing position in said closed position of said segments.

6. The apparatus of claim 5 wherein said movable segments are pivotally mounted on pivot axes for movement toward and away from one another and said bands have band ends attached to said movable segments above said pivot axes.

7. The apparatus of claim 5 wherein said movable segments have cooperating upwardly facing workpiece supporting surfaces on which a workpiece is supported in said closed position of said movable segments and from which a workpiece falls onto said bands when said movable segments are moved to said open position.

8. Apparatus for longitudinally transporting elongated workpieces comprising: a feed channel in which workpieces are positioned for longitudinal transportation, said feed channel including at least one movable segment which is movable between an open position providing a generally upwardly open path for transverse movement of elongated workpieces into said feed channel and a closed position in which an elongated workpiece in said feed channel is sufficiently circumferentially surrounded to prevent lateral displacement of the workpiece from said feed channel, flexible band means extending transversely across said feed channel for lowering elongated workpieces into said feed channel, said band means being movable between upper and lower positions, said upper position being a workpiece receiving and supporting position for receiving and supporting a workpiece moving transversely into said feed channel along said generally upwardly open path with said movable segment in said open position, said lower position of said band means being a workpiece releasing position in which a workpiece is released from said band means and is supported within said feed channel.

9. The apparatus of claim 8 wherein said band means comprises at least one flexible band having opposite band ends, one of said band ends being fixed to said movable segment for moving said band to said upper position when said movable segment moves to said open position and for moving said band to said lower position when said movable segment moves to said closed position.

10. The apparatus of claim 8 wherein said generally upwardly open path is substantially vertical for transverse movement of elongated workpieces substantially vertically downwardly so that breakage of said band means still causes the workpiece to be received by said channel.

11. The apparatus of claim 8 wherein said channel includes a bottom portion having an upwardly facing supporting surface, said band means in said upper position thereof extending transversely across said bottom portion in upwardly spaced relationship to said supporting surface, and said band means in said lower position thereof being spaced below said supporting surface.

12. The apparatus of claim 8 wherein said channel includes opposite segments at least one of which is defined by said movable segment and is movable toward and away from the other of said opposite segments.

13. The apparatus of claim 12 wherein said opposite segments have upper workpiece supporting surfaces for supporting a workpiece thereon above and outside said feed channel when said movable segment is in said closed position, said band means being attached to said segments for movement of said band means to said upper workpiece supporting position in said open position of said movable segment and for movement of said band means to said lower workpiece releasing position in said closed position of said movable segment, whereby movement of said movable segment to said open position allows a workpiece supported on said supporting surfaces of said segments to fall between said segments for reception and support on said band means and subsequent movement of said movable segments toward said closed position thereof moves said band means to said lower workpiece releasing position for lowering the workpiece onto said feed channel.

* * * * *